March 14, 1950     O. G. BENNETT     2,500,790
HEATING ELEMENT
Filed Feb. 20, 1946
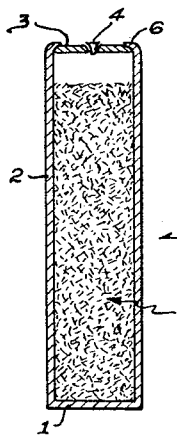
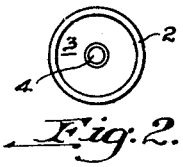
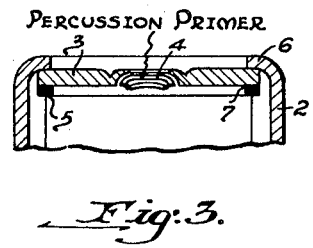
Fig. 1.
IGNITIBLE COMPOSITION THAT LIBERATES HEAT BUT NO GAS
Fig. 2.
PERCUSSION PRIMER
Fig. 3.
WITNESSES:
E. J. Maloney
Fulton B. Flick
INVENTOR
OWEN G. BENNETT.
BY Brown, Critchlow, Flick & Peckham
his ATTORNEYS.

Patented Mar. 14, 1950

2,500,790

UNITED STATES PATENT OFFICE 2,500,790

HEATING ELEMENT

Owen G. Bennett, Baltimore, Md., assignor to Catalyst Research Corporation, Pittsburgh, Pa., a corporation of Maryland Application February 20, 1946, Serial No. 648,980

13 Claims. (Cl. 126—263)

This invention relates to heating elements for rapidly supplying limited amounts of heat for such diverse purposes as heating canned foodstuffs, heating water for shaving, first aid, and the like purposes, heating infants' bottles, and heating hot pad devices.

Several means have been proposed and used for various of the foregoing purposes. For example, compositions reactive with water to liberate heat have been used in the so-called chemical hot pads. Such compositions are disadvantageous in that it is difficult to maintain them adequately reactive in storage, especially in places where the humidity is high, and also because the rate of heat evolution and the total amount of heat liberated are not great enough for many purposes. Solid fuels, such as nitrocellulose gels impregnated with alcohol, have likewise been used, chiefly for the heating of small amounts of water or of foodstuffs, but they are likewise disadvantageous because here again the heating rate is low, the alcohol may evaporate during storage, the combustion gives off gases, and the fuel may be hard to light or to keep lighted under field conditions. Also, it has been proposed to use open end cartridges containing combustible compositions; these are capable of giving heat at a high rate but various factors militate against their general adoption and use. For instance, such cartridges do not stand up under surveillance, i. e., they are susceptible to the influence of moisture, and inasmuch as the atmosphere has access to the combustible composition, they become more or less rapidly ineffective. Likewise, such cartridges are not adapted to all types of emergency or field heating, and they are dangerous in that hot products of combustion, which may be at red or white heat, may escape with the liability of injury to the person or of setting fire to the surroundings.

It is among the objects of this invention to provide autogenous heating elements that liberate a large amount of heat rapidly, that are ignited rapidly and with certainty under all conditions of use and irrespective of the length or conditions of storage, that are wholly self-conditioned and liberate substantially no gaseous products of combustion, that are wholly safe to use and function reliably, that are applicable to all purposes where limited amounts of heat are required for domestic, field, emergency and the like purposes, that may be made readily and inexpensively, and that are free from the disadvantages of prior art heating elements and means proposed for similar purposes.

The invention will be described with reference to the accompanying drawings in which Fig. 1 is a longitudinal cross sectional view through the preferred embodiment of the invention; Fig. 2 a plan view of the element shown in Fig. 1; and Fig. 3 an end view on an enlarged scale of the upper end of the element shown in Figs. 1 and 2.

The autogenous heating elements provided by this invention comprise an elongate tubular heat conducting member, a percussion primer associated therewith, and a combustible charge hermetically sealed within the member for ignition by the primer and which upon being so ignited liberates a large amount of heat rapidly and with the production of substantially no gaseous products of combustion. In this way I provide self-contained heating elements, or cartridges, that embody all of the stated objects of the invention. Thus, they liberate heat at a rate and in an amount such as is needed for the rapid heating of canned foodstuffs, shaving water, infants' milk bottles, hot pads, and other purposes. Because the containers are hermetically sealed the combustible charge is protected against humidity and other deleterious influences or changes, there is no possibility for the charge to be spilled prior to or at the time of use, and the solid or molten products of combustion cannot escape. The provision of percussion primer ignition insures certain combustion under all conditions of use, which is especially desirable in the field where weather conditions may make it difficult, if not impossible, to start heating elements that require ignition by an external flame, a fuse, a friction element, or the like.

The tubular member, or container, is preferably constructed from a metal of good heat conductivity, most suitably aluminum or magnesium, or their alloys, although it will be understood that other metals may be used such, for example, as copper, iron and steel. For most purposes it is preferred that the cross section of the chamber within the cartridge member be small relative to its length because thereby more rapid heat transfer is effected than is the case where the cross section of the combustible charge is great.

A wide variety of combustible compositions adapted for use in the practice of the invention are known and have been described in prior publications. Such compositions comprise at least one oxidizing agent and at least one reducing agent. Examples of suitable reducing agents are finely divided metals such, for example, as aluminum, zinc, nickel, antimony, zirconium, iron, and their alloys, as well as various intermetallic compounds such as calcium silicide. A wide variety of oxidizing agents are also known, including the permanganates, such as potassium permanganate; the chlorates and perchlorates, such as those of the alkali and alkaline earth metals; inorganic oxides and peroxides, such as barium peroxide, iron oxide, litharge, manganese dioxide, and others; the chromates, such as barium chromate; as well as sulfur and other elements that will combine exothermically with metals. These materials, and particularly the metals should be in finely divided condition, and they are to be intimately mixed. For most purposes it is preferred to compact them in the container under relatively high pressure, for example several thousand pounds per square inch, to insure complete combustion of the charge and to avoid segregation of the various constituents during handling of the elements.

Some combinations of such metals and oxidizing agents generate exceedingly high temperatures, as is known. In such cases the violence of the reaction can be abated by using slower oxidizing agents and by adding an inert diluent, e. g., diatomaceous earth, mica, powdered glass, or the like.

When proportioned stoichiometrically the compositions of the types described are productive substantially wholly of solid products of combustion, and they liberate no appreciable amount of gaseous products. In insure this, however, I now prefer that the compositions shall contain a small excess of the reducing agent, or metal, to obviate release of free oxygen from the oxidizing agent. Although these compositions do not liberate gas, it is preferred that the charge shall not wholly fill the container because air will inevitably be entrapped in the container, and the contained air will expand during combustion of the charge, with the possibility of breaking the hermetic seal. By providing a small air space within the container such a consequence is avoided.

Having reference now to the drawings, Figs. 1 to 3 represent the preferred type of heating element in accordance with the invention. It comprises an elongate cartridge member having a bottom wall 1 which is integral with a tubular side wall 2 to provide an elongate cylindrical chamber the cross section of which, as seen in Fig. 1, is small relative to the length of the chamber. Within the chamber thus provided there is placed an ignitable composition that liberates a large amount of heat rapidly, such as one each of the foregoing metals and oxidizing agents, and the top opening is hermetically sealed by a closure member 3 that is provided centrally with a percussion primer, or cap, 4. In this embodiment the bottom edge of closure 4 rests against a seat, or shoulder 5 formed interiorly adjacent the top end of the side wall 2, and it is secured in place to provide the desired sealing, by spinning or otherwise forcing the top end 6 of the side wall over the closure member, as seen particularly in Fig. 3. A sealing gasket 7 may be disposed between shoulder 5 and closure 3, if desired.

As an example of the results to be obtained through the practice of the invention, reference may be made to cartridges such as shown in Figs. 1 to 3 which were 3 inches in overall length with the side wall ¾ inch in outside diameter and ⅝ inch in inside diameter, and providing a chamber, below the cap, 2¾ inches in length. 35 grams of a combutible composition consisting, by weight, of 26 per cent of sublimed zinc, 28 per cent of 200-mesh manganese dioxide, 10 per cent of 150-mesh electrolytic iron, and 36 per cent of barium chromate was packed in the chamber under a pressure of about 6000 pounds per square inch so that the charge occupied 2½ inches of the chamber length, thus leaving about ¼ inch for expansion of air trapped within the chamber. Such a charge will liberate about 8 kilocalories of heat. When such a cartridge is ignited by the percussion cap and inserted in a tumbler or other container holding 200 cc. of water, the temperature of the water will be raised from normal room temperature, say 22° C., to 65° C. in two minutes. The temperature to which the water is heated is about the maximum that can be withstood comfortably by the human skin. Thus such a cartridge will rapidly heat water needed for various purposes, such as for the first aid cleansing of wounds, for shaving, for making coffee or tea in the field, and the like.

These cartridges may be used, as indicated, for immersion heating. They may be used also by inserting them into an element that is to be heated.

Although reference has been made hereinabove to the use of various heat liberating compositions, I now prefer that the combustible charge be composed of finely divided zinc, manganese dioxide and barium chromate, most suitably in substantially stoichiometrical proportions. I have found that although stoichiometrical mixtures of finely divided zinc and manganese dioxide burn freely in air, they do not undergo combustion satisfactorily when confined in a cartridge in accordance with the invention, and that the same thing is true of stoichiometrical mixtures of finely divided zinc and barium chromate. I have found further that, queerly enough, mixtures of those two compositions will burn satisfactorily and completely when confined in a compressed condition in my new cartridges. For many purposes I prefer to use a mixture of 60 per cent by weight of the zinc-manganese dioxide composition and 40 per cent by weight of the zinc-barium chromate composition. However, other ratios may be used such, for example, as equal parts by weight of each. A typical composition is as follows:

| | Per cent by weight |
|---|---|
| Zinc dust | 33.8 |
| Barium chromate | 43.4 |
| Manganese dioxide | 22.8 |

These compositions are especially desirable for the present purposes because when compressed, say at about 6000 p. s. i., and confined in the cartridges they burn slowly so that the heat of combustion is liberated progressively and at a slow rate, as is desirable, and they burn completely while otherwise conforming to the characteristics stated above. For most purposes I prefer to add about 1 part by weight of aluminum powder so that a 35 gram charge will liberate about 8 kilocalories of heat.

The manganese dioxide may be supplied as finely divided pyrolusite but this material should be heated, say to about 400° C., before being mixed with the other materials in order to drive off the normal water content of the ore. The zinc is preferably supplied as minus 200 mesh dust produced by condensation of zinc vapor. The barium chromate may be the standard pigment grade.

The foregoing typical composition is not readily ignited by an ordinary cartridge primer. I find, however, that is is ignited promptly and with certainty by placing on top of the charge, immediately below the primer, a starter charge of about 1 gram of a substantially stoichiometrical mixture of electrolytic iron and manganese dioxide. Suitably the iron powder is fine enough so that it preponderantly passes a 325 mesh sieve.

Various modifications are possible and will occur to those familiar with the art. For instance, although the integral bottom and side wall construction shown in Fig. 1 is desirable for various reasons, the cartridges might be constructed from open end seamless or seamed cylinders with the bottom and top closures crimped, brazed or otherwise fastened in place. Also, for special purposes the percussion cap might be associated with other portions of the cartridges than the top closure. Devices adapted particularly to be used with heating cartridges as described and claimed herein are described and claimed in a copending application filed by me on August 4, 1947, Serial No. 766,020.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. As a new article of manufacture, an autogenous heating cartridge comprising an elongate hermetically sealed member, a percussion primer mounted in said member, and a combustible charge disposed in said member adapted to be ignited by said primer to thereby liberate a large amount of heat rapidly, without production of a substantial amount of gaseous products of combustion, and the volume of said charge being such as to provide a space for expansion of air trapped within the cartridge without affecting its hermetic sealing during combustion of the charge.

2. As a new article of manufacture, an autogenous heating cartridge comprising an elongate hermetically sealed member, a percussion primer mounted in said member, a combustible charge disposed in said member and composed of at least one reducing agent and at least one oxidizing agent and adapted to be ignited by said primer to thereby liberate a large amount of heat rapidly, without production of a substantial amount of gaseous products of combustion, and the volume of said charge being such as to provide a space for expansion of air trapped within the cartridge without affecting its hermetic sealing during combustion of the charge.

3. As a new article of manufacture, an autogenous heating cartridge comprising an elongate hermetically sealed member, a percussion primer mounted in said member, a combustible charge disposed in said member and composed of at least one finely divided combustible metal and at least one oxidizing agent and adapted to be ignited by said primer to thereby liberate a large amount of heat rapidly and without production of a substantial amount of gaseous products of combustion, and the volume of said charge being such as to provide a space for expansion of air trapped within the cartridge without affecting its hermetic sealing during combustion of the charge.

4. As a new article of manufacture, an autogenous heating cartridge according to claim 3, the volume of said charge being such as to provide a space for expansion of air trapped within the cartridge without affecting its hermetic sealing during combustion of the charge.

5. As a new article of manufacture, an autogenous heating cartridge comprising an elongate closed bottom tubular member, a top closure hermetically associated with the open end of said member, a percussion primer mounted in said top closure, a combustible charge disposed in said tubular member and composed of at least one reducing agent and at least one oxidizing agent and adapted to be ignited by said primer to thereby liberate a large amount of heat rapidly and without production of a substantial amount of gaseous products of combustion, and the volume of said charge being such as to provide a space for expansion of air trapped within the cartridge without affecting its hermetic sealing during combustion of the charge.

6. As a new article of manufacture, an autogenous heating cartridge comprising an elongate hermetically sealed member, a percussion primer mounted in said member, a combustible charge disposed in said member and composed of at least one finely divided combustible metal and at least one oxidizing agent, said metal being in excess of the amount stoichiometrically equivalent to the oxygen available from the amount of said agent present, said charge being adapted to be ignited by said primer to thereby liberate a large amount of heat rapidly, without production of a substantial amount of gaseous products of combustion, and without affecting the hermetic sealing of the cartridge.

7. As a new article of manufacture, an autogenous heating cartridge comprising an elongate closed bottom tubular member, a top closure hermetically associated with the open end of said member, a percussion primer mounted in said top closure, a combustible charge disposed in said tubular member and composed of at least one finely divided combustible metal and at least one oxidizing agent, said metal being in excess of the amount stoichiometrically equivalent to the oxygen available from the amount of said agent present, said charge being adapted to be ignited by said primer to thereby liberate a large amount of heat rapidly and without production of a substantial amount of gaseous products of combustion, and the volume of said charge being such as to provide a space for expansion of air trapped within the cartridge without affecting its hermetic sealing during combustion of the charge.

8. A cartridge according to claim 2, said charge comprising zinc dust, barium chromate, and manganese dioxide.

9. A cartridge according to claim 2, said charge comprising substantially stoichiometrical proportions of zinc dust, barium chromate, and manganese dioxide.

10. A cartridge according to claim 2, said charge comprising, by weight, about 34 parts of zinc dust, about 43 parts of barium chromate, and about 23 parts of manganese dioxide.

11. A cartridge according to claim 2, said charge comprising, by weight, about 34 parts of zinc dust, about 43 parts of barium chromate, about 23 parts of manganese dioxide, and one part of aluminum powder.

12. A cartridge according to claim 2, said charge comprising, by weight, about 34 parts of zinc dust, about 43 parts of barium chromate, about 23 parts of manganese dioxide, and one part of aluminum powder, and having a starting charge adjacent said primer composed of iron powder and manganese dioxide.

13. A cartridge according to claim 2, said charge comprising substantially stoichiometrical proportions of zinc dust, barium chromate, and manganese dioxide, and having a starting charge adjacent said primer composed of substantially stoichiometrical proportions of iron powder and manganese dioxide.

OWEN G. BENNETT.

REFERENCES CITED

The following references are of record in the file of this patent:

UNITED STATES PATENTS

| Number | Name | Date |
|---|---|---|
| 802,256 | Bamberger et al. | Oct. 17, 1905 |
| 847,668 | Lang | Mar. 19, 1907 |
| 1,417,075 | La Cour et al. | May 23, 1922 |
| 1,434,538 | Gravell | Nov. 7, 1922 |
| 1,573,872 | Schwartz | Feb. 23, 1926 |
| 2,020,292 | Eggert et al. | Nov. 12, 1935 |
| 2,384,278 | Caldwell | Sept. 4, 1945 |
| 2,388,466 | Caldwell | Nov. 6, 1945 |

FOREIGN PATENTS

| Number | Country | Date |
|---|---|---|
| 11,468 | Great Britain | of 1904 |